(12) United States Patent
Chow et al.

(10) Patent No.: US 10,654,488 B2
(45) Date of Patent: May 19, 2020

(54) ACCELERATION BOOSTER

(71) Applicant: Toyota Motor Engineering & Manufacturing North America, Inc., Plano, TX (US)

(72) Inventors: Justin Chow, Ann Arbor, MI (US); Shannon Wrobel, Ann Arbor, MI (US); Abril Galang, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 240 days.

(21) Appl. No.: 15/914,850

(22) Filed: Mar. 7, 2018

(65) Prior Publication Data

US 2019/0276045 A1 Sep. 12, 2019

(51) Int. Cl.
*B60W 50/08* (2020.01)
*B60W 30/18* (2012.01)
(Continued)

(52) U.S. Cl.
CPC .... *B60W 50/087* (2013.01); *B60W 30/18154* (2013.01); *B60T 8/00* (2013.01);
(Continued)

(58) Field of Classification Search
CPC ......... B60W 30/182; B60W 30/18118; B60W 50/087; B60W 10/06; B60W 30/18; B60W 50/082; B60W 50/0098; B60W 20/00; B60W 20/20; B60W 20/40; B60W 20/10; B60W 50/14; B60W 30/18154; B60W 2556/50; B60W 2555/60; B60W 2554/80; B60W 2050/0078; B60W 2540/10; B60W 30/18027; B60W 10/08; B60W 10/30; F02M 26/71; F02M 26/07;
(Continued)

(56) References Cited

U.S. PATENT DOCUMENTS 4,467,219 A 8/1984 Reid
6,026,784 A 2/2000 Weisman et al.
(Continued)

FOREIGN PATENT DOCUMENTS

EP 2607645 10/2015

*Primary Examiner* — Behrang Badii
(74) *Attorney, Agent, or Firm* — Snell & Wilmer LLP (57) ABSTRACT

Methods, systems, and apparatus for providing an acceleration boost. The acceleration boosting system provides or outputs a boosted acceleration. The acceleration boosting system includes a communication device, a navigation unit or a first sensor that is configured to obtain acceleration information. The acceleration boosting system includes a second sensor that is configured to detect or measure an applied force of an accelerator pedal. The applied force corresponds to a first amount of energy that is used to power or propel the vehicle. The acceleration boosting system includes an electronic control unit that is configured to determine that the acceleration information indicates that a driver should accelerate. The electronic control unit is configured to determine that the accelerator pedal is depressed within a threshold time limit of the indication and cause a second amount of energy to be converted to move or propel multiple wheels.

20 Claims, 6 Drawing Sheets

(51) Int. Cl.
  *B60W 50/00* (2006.01)
  *F02M 26/71* (2016.01)
  *F02B 37/18* (2006.01)
  *B60T 8/00* (2006.01)
  *B60W 30/182* (2020.01)

(52) U.S. Cl.
  CPC ... *B60W 30/182* (2013.01); *B60W 2050/0078* (2013.01); *B60W 2540/10* (2013.01); *B60W 2554/80* (2020.02); *B60W 2555/60* (2020.02); *B60W 2556/50* (2020.02); *F02B 37/18* (2013.01); *F02M 26/71* (2016.02)

(58) Field of Classification Search
  CPC ........ F02M 35/10157; F02M 35/10255; B60L 50/16; B60L 15/2009; B60L 7/18; B60L 15/2018; F16H 61/16; F16H 61/68; F02B 39/04; F02B 37/18; F02B 33/40; F02B 37/16; F02B 39/16; F02B 37/12; B60T 7/042; B60T 8/00; B60T 8/17; B60T 8/1769; B60T 8/3275; B60T 13/745; B60T 8/3265; F01N 13/009; F01N 13/10; F02D 9/02; F02D 41/0255; F02D 41/0007; F02D 29/02; F02D 41/10; F02D 23/00; B60K 6/445; B60K 35/00; B60K 6/442; B60K 6/365; B60K 26/021
  See application file for complete search history.

(56) References Cited

U.S. PATENT DOCUMENTS

| | | | |
|---|---|---|---|
| 6,505,503 | B1 | 1/2003 | Teresi et al. |
| 6,629,515 | B1 | 10/2003 | Yamamoto et al. |
| 7,890,241 | B2 | 2/2011 | Russell |
| 8,185,296 | B2 | 5/2012 | Yokoyama et al. |
| 8,718,853 | B2 | 5/2014 | Ulrey et al. |
| 8,786,421 | B2 | 7/2014 | Dozza |
| 9,321,447 | B2 | 4/2016 | Abuelsaad et al. |
| 9,437,110 | B2 | 9/2016 | Otake |
| 9,550,498 | B2 | 1/2017 | Meyer et al. |
| 2003/0060936 | A1* | 3/2003 | Yamamura ........... B60K 26/021 701/1 |
| 2009/0322503 | A1* | 12/2009 | Suzuki ................ B60L 50/16 340/438 |
| 2013/0024090 | A1* | 1/2013 | Minase ............ B60W 30/1882 701/102 |
| 2013/0123066 | A1* | 5/2013 | Tomiie ............... B60W 50/087 477/185 |
| 2015/0232026 | A1 | 8/2015 | Lueke et al. |
| 2016/0169096 | A1* | 6/2016 | Ossareh ................ F02B 39/04 123/559.1 |
| 2016/0257197 | A1* | 9/2016 | Fader ..................... F16H 61/16 |
| 2017/0015203 | A1 | 1/2017 | Oguri |
| 2017/0149332 | A1 | 5/2017 | Tanigawa et al. |
| 2017/0260915 | A1* | 9/2017 | Zhang ................... F02M 26/71 |
| 2018/0186352 | A1* | 7/2018 | Goto .................. B60W 30/182 |

* cited by examiner

ACCELERATION BOOSTER

BACKGROUND

Field

This specification relates to an acceleration booster for a vehicle.

Description of the Related Art

When driving, drivers may be distracted by various devices, such as a smartphone, a radio, or a user display, or may be otherwise pre-occupied. Driver inattentiveness contributes to accidents, which may lead to fatalities and injuries. Moreover, driver inattentiveness may delay a driver's response time, which may cause a delay to other drivers. For example, when stopped at a traffic light and the traffic light transitions to a green light, an inattentive driver may not see that a light has changed to a green light. This prevents other vehicles behind the stopped vehicle from moving forward.

Additionally, boredom may cause driver inattentiveness. If a driver is bored, the driver may seek other distractions while driving, such as a conversation with a passenger or a conversation over a phone. Thus, the driver's attention is diverted away from the road and toward the other task.

Accordingly, there is a need for a system and method for increasing a driver's response time and attentiveness toward driving.

SUMMARY

In general, one aspect of the subject matter described in this specification may be embodied in an acceleration boosting system that provides or outputs a boosted acceleration. The acceleration boosting system includes at least one of a communication device, a navigation unit or a first sensor that is configured to obtain acceleration information related to a timing of an acceleration of the vehicle. The acceleration boosting system includes a second sensor. The second sensor is configured to detect or measure an applied force of an accelerator pedal of the vehicle. The applied force corresponds to a first amount of energy that is used to power or propel the vehicle. The acceleration boosting system includes an electronic control unit. The electronic control unit is connected to the first sensor and/or the second sensor. The electronic control unit is configured to determine when the acceleration information indicates that a driver should begin to accelerate. The electronic control unit is configured to determine that the accelerator pedal is depressed within a threshold time limit of the indication that the driver should begin to accelerate and cause a second amount of energy that is different than the first amount of energy to be converted and/or transferred to the motor and/or generator to move or propel multiple wheels of the vehicle.

These and other embodiments may optionally include one or more of the following features. The second amount of energy may be greater than the first amount of energy to be converted and/or transferred to move or propel the multiple wheels of the vehicle. The acceleration boosting system may include a turbocharger that is configured to boost a power output of an engine or a motor of the vehicle. In order to cause the second amount of energy to be greater than the first amount of energy, the electronic control unit may be configured to spool the turbocharger to boost the power output of the engine or the motor. Also, in order to cause the second amount of energy to be greater than the first amount of energy, the electronic control unit may be configured to release the reserve of the electrical energy stored in the battery to the drivetrain and cause the drivetrain to move the multiple wheels of the vehicle.

The accelerator pedal may be depressed by the driver or autonomously before the acceleration information indicates that the driver or the vehicle should begin to accelerate. The second amount of energy may be less than the first amount of energy to be converted to move or propel the multiple wheels of the vehicle.

The communication device may be a vehicle-to-infrastructure (V2I) communication device and to obtain the acceleration information, the V2I communication device may be configured to establish a wireless connection with a traffic light. The V2I communication device may receive wirelessly, from the traffic light, the acceleration information. The acceleration information may include an indication of when the traffic light is turning green or about to turn green (e.g., within a predetermined time period of 1-5 seconds).

The acceleration boosting system may include a battery for storing electrical energy including a reserve of the electrical energy for boosting. The acceleration boosting system may include a battery management control unit that is configured to manage the electrical energy in the battery. The acceleration boosting system may include a drivetrain that adapts the electrical energy to move or propel the multiple wheels of the vehicle.

The first sensor may be configured to detect or measure a distance between the vehicle and another vehicle that is in front of the vehicle. The electronic control unit may be configured to determine that the measured distance between the back vehicle and the front vehicle is increasing to determine that the acceleration information indicates that the driver of the back vehicle should begin to accelerate.

The navigation unit may be configured to determine a current location of the vehicle and may identify an acceleration event within a threshold distance of the current location of the vehicle.

In another aspect, the subject matter may be embodied in a method for boosting a vehicle. The method includes obtaining, by an electronic control unit and from at least one of a communication device, a first sensor or a navigation unit, an acceleration event indicator that indicates an occurrence of an acceleration event. The method includes obtaining, by a second sensor, an acceleration indicator that indicates that the accelerator pedal is depressed. The method includes determining, by the electronic control unit, that the accelerator pedal is depressed based on the acceleration indicator. The method includes outputting, using a drivetrain, an amount of power output that moves multiple wheels of the vehicle based on when the accelerator pedal is depressed relative to when the acceleration event indicator is obtained.

In another aspect, the subject matter may be embodied in an acceleration boosting system for a first vehicle. The acceleration boosting system includes at least one of a communication device, a navigation unit or a first sensor configured to obtain acceleration information. The acceleration boosting system includes a second sensor configured to detect an applied force on an accelerator pedal of the vehicle. The applied force corresponds to a first amount of energy that is converted to move multiple wheels of the vehicle. The acceleration boosting system includes a processor connected to the one or more sensors. The processor is configured to obtain the acceleration information. The processor is configured to determine that a driver (or an autonomous vehicle) should accelerate at a particular time based on the acceleration information. The processor is configured to determine that the accelerator pedal is depressed within a threshold time limit of the particular time and control an amount of energy that is to be converted to move the multiple wheels of the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for determining and implementing the boosted acceleration. Particular embodiments of the subject matter described in this specification may be implemented to realize one or more of the following advantages. The acceleration boosting system ("boosting system") provides a boosted acceleration to a vehicle when a driver times the depression of the accelerator pedal to coincide with or within a threshold time limit of the transition of a traffic signal to a green light or other condition that may warrant acceleration of the vehicle. The boosted acceleration provides a burst of acceleration that causes the vehicle to accelerate out in front of other surrounding vehicles. Moreover, the boosted acceleration may cause a feeling or sense of exhilaration and/or elation within the driver, as a result of adrenaline, for example. This incentivizes the driver to pay attention to the traffic signal, which reduces the driver's response time when the traffic signal transitions to the green light or other conditions that may warrant acceleration. Since the driver is more attentive, the flow of traffic may improve as other drivers are not prevented from moving forward.

Other benefits and advantages include the ability to automatically disable the boosted acceleration if there is a hazard and/or traffic that is in front of the driver that may cause an accident. Additionally, the boosting system may provide the boost in other situations, such as after a vehicle has turned on or when the vehicle is entering onto an on-ramp or merging from the on-ramp into traffic. This keeps the driver attentive to the roadway while providing a sudden acceleration that assists the vehicle into entering into the flow of traffic. Moreover, the boosted acceleration reduces the amount of travel time and/or acceleration time and allows the vehicle to get in front of the other surrounding vehicles.

Figure 1:
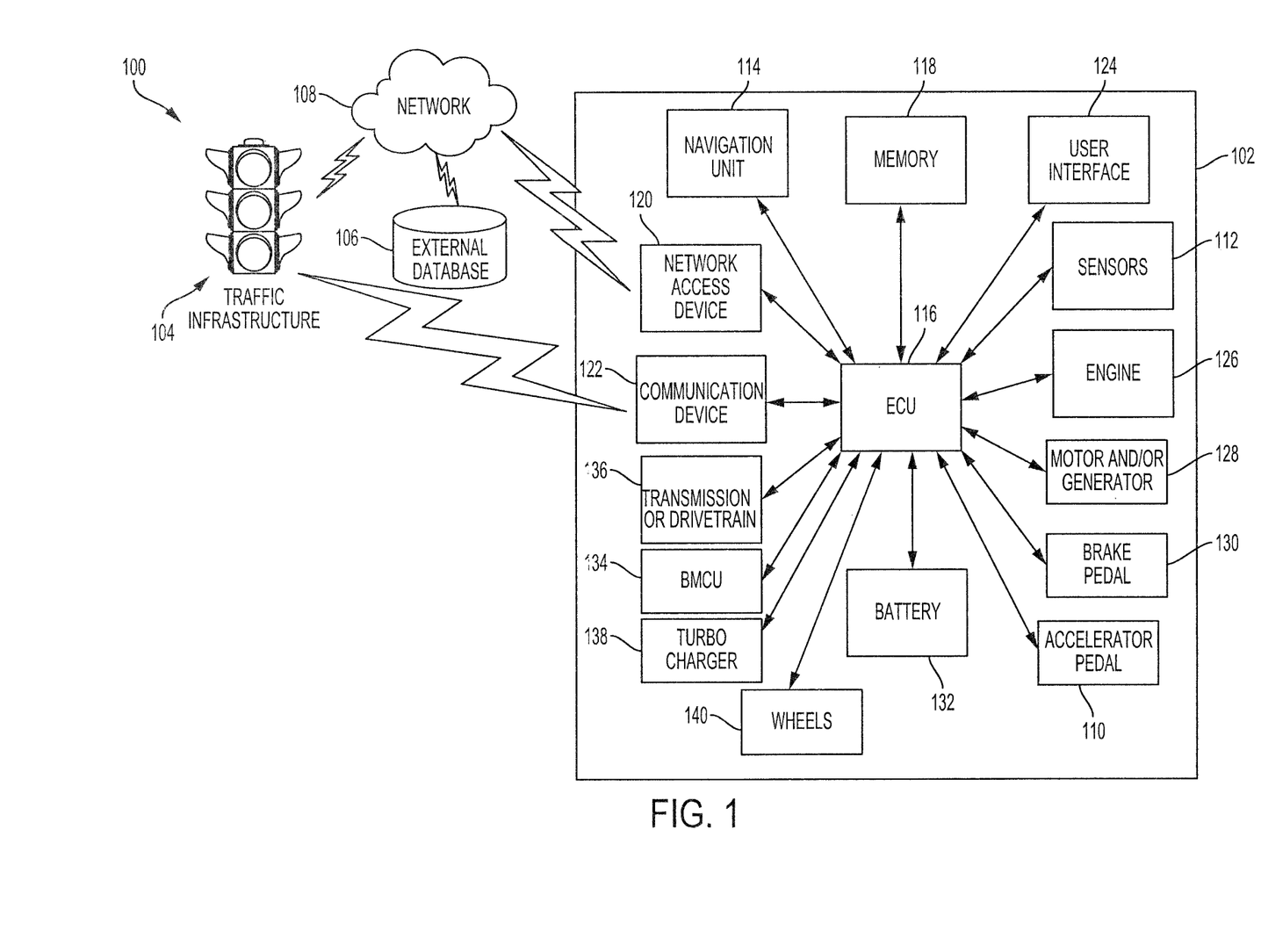
FIG. 1 is a block diagram of an example acceleration boosting system according to an aspect of the invention.

FIG. 1 is a block diagram of an acceleration boosting system 100 ("boosting system"). The boosting system 100 provides a sudden acceleration, a sudden burst of speed or boost to the vehicle 102 as a driver depresses the accelerator pedal 110 to accelerate the vehicle 102. The boosting system 100 may provide a sudden burst of speed under various circumstances, such as when the driver depresses the accelerator pedal 110 within a threshold time limit after a traffic light turns green, is about to turn green or when the vehicle 102 enters an on-ramp or is merging into traffic on a highway.

The boosting system 100 may include a vehicle 102, one or more external databases 106 and/or a traffic infrastructure 104. In some implementations, the boosting system 100 is a separate device from the vehicle 102, the one or more external databases 106 and/or the traffic infrastructure 104, and instead, connects to, is included in or is retro-fitted to the vehicle 102, the one or more external databases 106 and/or the traffic infrastructure 104. For example, the boosting system 100 may connect to or be retro-fitted to the vehicle 102 and wirelessly connect to the traffic infrastructure 104 and/or the one or more external databases 106 through a network 108. The boosting system 100 includes any or all of the vehicle components of the vehicle 102 and/or interacts with the remaining vehicle components of the vehicle 102.

A vehicle, e.g., vehicle 102, is a conveyance capable of transporting a person or persons or any material or any permanently or temporarily affixed apparatus. The vehicle may be a self-propelled wheeled conveyance, such as a car, truck, bus, van or other motor and/or battery driven vehicle. For example, the vehicle 102 may be an electric vehicle, a hybrid vehicle, or a plug-in hybrid vehicle. Other examples of vehicles include bicycles, trains, planes, or boats, and any other form of conveyance that is capable of transportation. The vehicle may be a semi-autonomous or an autonomous vehicle. That is, the vehicle 102 may be self-maneuvering and capable of sensing the environment and navigating without human input. An autonomous vehicle may use one or more sensors, e.g., the one or more sensors 112, and a navigation unit, e.g., the navigation unit 114, to drive autonomously.

A traffic infrastructure 104 signals a driver of a vehicle 102 to stop, yield, accelerate and/or turn. The traffic infrastructure 104 includes a traffic light or other signal light, such as a ramp meter. The traffic light may be located at an intersection and provide and/or transition between various signals, such as a red light, a yellow light, a green light, a left and/or right turn signal in red, yellow and/or green, and/or combinations thereof. The ramp meter may be located at an on-ramp and provide and/or transition between a red light and a green light to signal to the driver to accelerate the vehicle 102 and merge onto a highway.

The one or more external databases 106 may include databases from different service providers. A service provider may provide information to the vehicle 102, such as navigational map information, traffic condition information, or other information. The information may be stored in the one or more external databases 106.

A database is any collection of pieces of information that is organized for search and retrieval, such as by a computer, and the database may be organized in tables, queries, schemas, queries, reports, or any other data structures. A database may use any number of database management systems. An external database 106 may include a third-party server or a website that stores or provides information. The information may be real-time information, updated periodically, or user-inputted. A server may be a computer in a network that is used to provide services, such as accessing files or sharing peripherals, to other computers in the network. A website may be a collection of one or more resources associated with a domain name.

Navigational map information may include locations of physical geographic features, such as hills, mountains, rivers and forests, and/or road features, such as highways, on-ramps, off-ramps, bridges, railroad crossings and toll roads. Traffic condition information includes one or more traffic features. The traffic features may include traffic congested areas, construction areas, or accident areas. The traffic features may include speed zones where the speed limit on a roadway changes or where the speed of the flow of the traffic changes. The traffic condition information may include information related to the density and movement of vehicles on a roadway such as a road, a highway, a tunnel, or a bridge, construction information, accident information, or information about vehicles in public/private structures that typically have congestion during specific hours or after specific events.

Features, e.g., terrain features, road features, or traffic features, each have a location that may be identified by map coordinates. The navigational map information and/or traffic condition information may include the map coordinates associated with the features. Map coordinates include latitude and longitudinal coordinates.

The boosting system 100 may be a separate device from the vehicle 102, the traffic infrastructure 104 and/or the one or more external databases 106. The boosting system 100 and/or the vehicle 102 may connect to the traffic infrastructure 104 and/or the one or more external databases 106 through a wireless network 108. The wireless network 108, such as a local area network (LAN), a wide area network (WAN), a cellular network, the Internet, or a combination thereof, may connect the vehicle 102 and/or the boosting system 100 to the one or more external databases 106.

The boosting system 100 includes a processor, such as an electronic control unit (ECU) 116, that is programmed to determine whether conditions are met to provide and/or cause a boosted acceleration to the vehicle 102. The boosting system 100 includes a memory 118, one or more sensors 112 and/or at least one of a network access device 120 or a communication device 122. The boosting system 100 may include a navigation unit 114 and/or a user interface 124. The boosting system 100 and/or the vehicle 102 may include an engine 126, a motor and/or generator 128, an accelerator pedal 110, a brake pedal 130, a battery 132, a battery management control unit (BMCU) 134, a transmission or drivetrain 136 and/or a turbocharger 138. The vehicle 102 includes multiple wheels 140 to move the vehicle 102.

The motor and/or generator 128 may convert electrical energy into mechanical power, such as torque, and may convert mechanical power into electrical energy. The motor and/or generator 128 may be coupled to the battery 132. The motor and/or generator 128 may convert the energy from the battery 132 into mechanical power, and may provide energy back to the battery 132, for example, via regenerative braking. In some implementations, the vehicle 102 may include one or more additional power generation devices such as the engine 126 or a fuel cell stack (not shown). The engine 126 combusts fuel to provide power instead of and/or in addition to the power supplied by the motor and/or generator 128. A turbocharger 138 may be connected to the engine 126 to further improve the efficiency of the engine 126 and power output of the engine 126. The turbocharger 138 forces extra air into a combustion chamber of the engine 126 to improve the power output and efficiency of the engine 126. The turbocharger 138 may be an electric turbocharger that outputs power to the the engine 126, the motor and/or generator 128 and/or directly to the transmission or drivetrain 136.

The battery 132 may be coupled to the motor and/or generator 128 and may provide electrical energy to and receive electrical energy from the motor and/or generator 128. The battery 132 may include one or more rechargeable batteries.

The BMCU 134 may be coupled to the battery 132, and may control and manage the charging and discharging of the battery 132. The BMCU 134, for example, may measure, using battery sensors, parameters used to determine the state of charge (SOC) of the battery 132. The BMCU 134 may control the battery 132 to maintain a reserve power for providing a sudden burst of electrical energy to be converted into power to drive, propel or move the multiple wheels 140 of the vehicle 102 when the conditions are met to activate the boosted acceleration.

The transmission or drivetrain 136 provides a controlled application of power to the multiple wheels 140 of the vehicle 102. The transmission or drivetrain 136 adapts the power output of the engine 126 and/or the motor and/or generator 128 to drive the multiple wheels 140 of the vehicle 102.

The ECU 116 may be electrically coupled to some or all of the components of the vehicle 102. The ECU 116 may include one or more processors or controllers specifically designed for automotive systems, and the functions of the ECU 116 may be implemented in a single ECU or in multiple ECUs. The ECU 116 may receive data from one or more components and control the operation of one or more components based on the received or determined data. For example, the ECU 116 may receive data from the navigation unit 114, the one or more sensors 112, the communication device 122 and/or the network access device 120 and integrate the data received from two or more of these devices to output a display on a user interface 124. The ECU 116 may determine when to activate the boosted acceleration and control the amount of boosted acceleration. The ECU 116 may control the operations of the BMCU 134 to charge or discharge the battery 132 and/or control operations of the turbocharger 138 to spool-up or spool-down the turbocharger 138 to control the activation and/or the amount of boosted acceleration.

The memory 118 may be coupled to the ECU 116. The memory 118 may store instructions to execute on the ECU 116 and may include one or more of a RAM or other volatile or non-volatile memory. The memory 118 may be a non-transitory memory or a data storage device, such as a hard disk drive, a solid-state disk drive, a hybrid disk drive, or other appropriate data storage, and may further store machine-readable instructions, which may be loaded and executed by the ECU 116 to cause the boosted acceleration.

The ECU 116 may be coupled to the one or more sensors 112 that detect various internal or external environmental parameters. For example, an acceleration pedal sensor may detect and/or measure an amount of pressure applied to the accelerator pedal 110 of the vehicle 102. The pressure applied corresponds to an amount of energy, power output or tuning that moves the multiple wheels 140 of the vehicle 102. Similarly, a brake pedal sensor may detect and/or measure an amount of pressure applied to the brake pedal 130 of the vehicle 102. In another example, a proximity sensor may detect surrounding objects and/or vehicles. The proximity sensor may measure a distance and/or a change in distance between the vehicle 102 and another surrounding object and/or vehicle.

The navigation unit 114 may include a Global Positioning System (GPS) unit (not shown) for detecting location data and date/time information. The navigation unit 114 may provide navigation instructions based on the detected location data and may include a memory (not shown) for storing route data. The navigation unit 114 may obtain navigational map information from the one or more external databases 106 and vehicle information, such as a current location or speed of the vehicle 102.

The navigation unit 114 may be integral to the vehicle 102 or a separate unit coupled to the vehicle 102, or may be separate from the vehicle 102, such as a personal device with navigation capability. When the navigation unit 114 is separate from the vehicle 102, the navigation unit 114 may communicate with the vehicle 102 via the network access device 120. In some implementations, the vehicle 102 may include a GPS unit instead of the navigation unit 114. In that regard, the ECU 116 may perform the functions of the navigation unit 114 based on data received from the GPS unit. At least one of the navigation unit 114 or the ECU 116 may predict or propose a route set that includes a starting location and a destination location. The navigation unit 114 or the ECU 116 may perform navigation functions. Navigation functions may include, for example, route and route set prediction, providing navigation instructions, and receiving user input such as verification of predicted routes and route sets or destinations.

The navigation unit 114 may include a user interface separate from the user interface 124 and/or may communicate via the user interface 124. The user interface 124 may be a vehicle display or a personal device, e.g., a mobile phone, a tablet, a personal computer, which is connected to the ECU 116 through the network access device 120 across the wireless network 108. The user interface 124 may include any device capable of receiving user input, such as a button, a dial, a microphone, or a touch screen, and any device capable of output, such as a display, a speaker, or a refreshable braille display. The user interface 124 allows a driver or a passenger of the vehicle 102 to communicate with the ECU 116. For example, the driver may be able to provide data to the ECU 116 and/or receive feedback from the ECU 116 via the user interface 124.

The network access device 120 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 120 may transmit data to and receive data from devices and systems not directly connected to the vehicle 102. For example, the ECU 116 may communicate with the external databases 106 via the network 108.

The communication device 122 may include a vehicle-to-infrastructure (V2I) communication device that communicates with the traffic infrastructure 104. The communication device 122 may communicate directly with traffic infrastructure 104 or through the wireless network 108.

Figure 2:
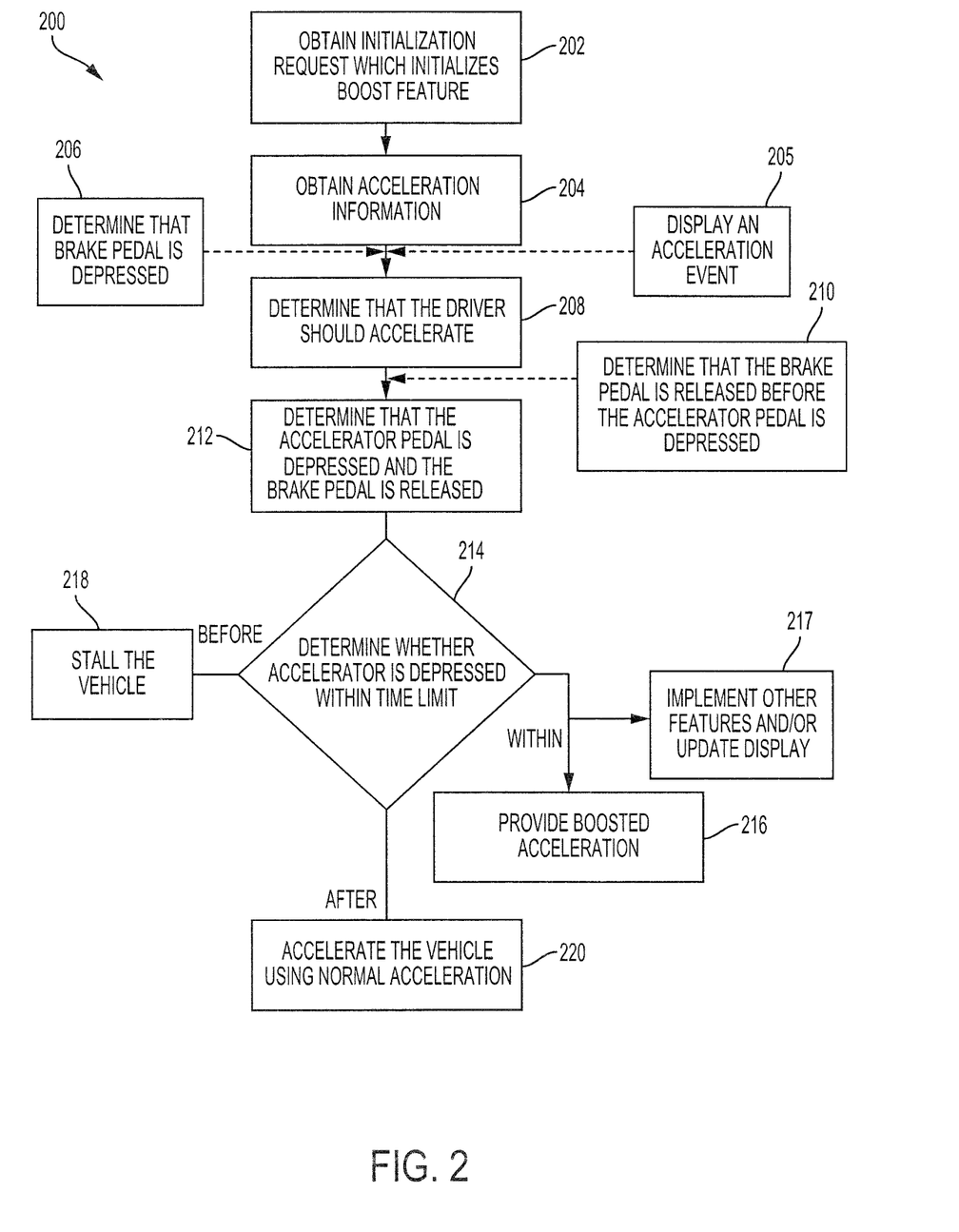
FIG. 2 is a flow diagram of an example process for generating and outputting a sudden burst of acceleration or boost using the acceleration boosting system of FIG. 1 according to an aspect of the invention.

FIG. 2 is a flow diagram of the process 200 for generating and outputting a sudden burst of acceleration to the vehicle 102. One or more computers or one or more data processing apparatuses, for example, the ECU 116 of the boosting system 100 of FIG. 1, appropriately programmed, may implement the process 200.

The boosting system 100 may obtain an initialization request, such as via user input through the user interface 124, which initializes the boosted acceleration feature (202). For example, the user input may set the vehicle 102 to an acceleration booster mode or to a sport mode. In some implementations, the boosting system 100 initializes automatically when the vehicle 102 is powered on or is switched into an acceleration booster mode or a sport mode. The vehicle 102 may switch into the sport mode automatically if one or more sensors 112, such as a vehicle speed sensor or a steering wheel sensor, detect that the driver is operating the vehicle 102 in an aggressive manner. For example, if the vehicle speed sensor detects that the driver aggressively accelerates the vehicle 102, such that the acceleration is greater than or equal to a threshold, or if the steering wheel angle sensor detects that the driver makes sharp turns, the vehicle 102 may automatically switch into the sport mode and initialize the boosting system 100.

Figure 3:
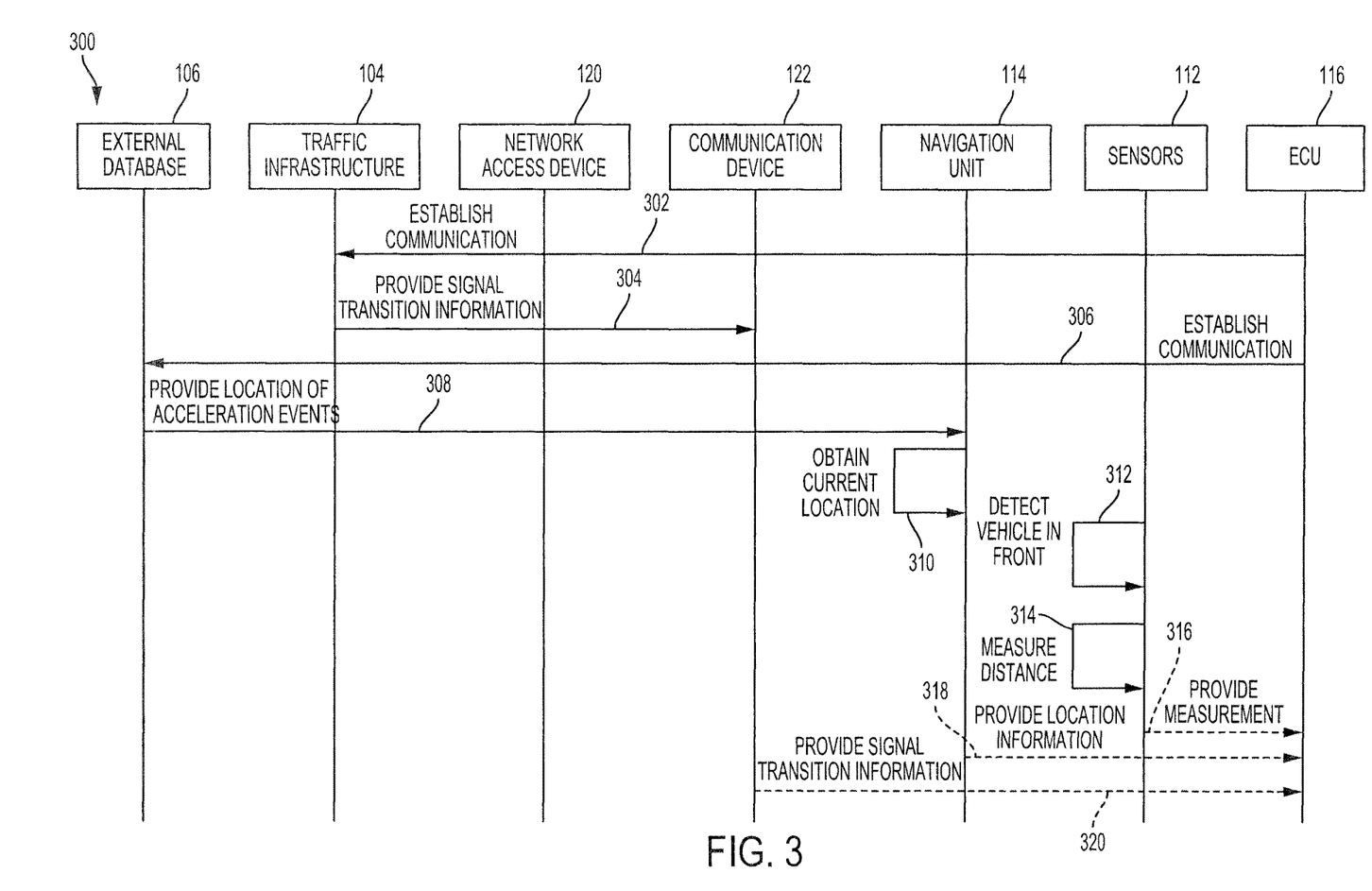
FIG. 3 is a sequence diagram of an example process for obtaining the acceleration information used by the acceleration boosting system of FIG. 1 to provide a boosted acceleration for a vehicle according to an aspect of the invention.

The boosting system 100 obtains the acceleration information from at least one of the navigation unit 114, the communication device 122, and/or the one or more sensors 112 (204). The acceleration information includes an indicator that indicates when the driver should accelerate the vehicle 102 by depressing the accelerator pedal 110 to minimize any delay in the driver's response time and accelerate the vehicle 102. The acceleration information may include an acceleration event of a timing of when a traffic signal transitions to a green light or other signal that indicates to the driver to accelerate, a distance and/or a relative distance between the vehicle 102 and another vehicle, a location of an acceleration event such as a road feature or a traffic feature and/or combinations thereof. For example, a sensor, such as a camera, may detect a transition of a traffic signal to a green light or a communication device, such as a vehicle-to-infrastructure communication device, may communicate with the traffic light to obtain the state of the traffic signal. FIG. 3 further describes the process 300 that the boosting system 100 utilizes to obtain the acceleration information.

The boosting system 100 may display the locations of one or more acceleration events included in the acceleration information on a user interface 124 (205). For example, an indicator may be positioned on a map on the location of a road feature and/or a traffic feature, such as an on-ramp or exit of a construction zone. The indicator indicates the location of the road feature and/or the traffic feature. If the driver achieves the boosted acceleration at the location of the road feature, the indicator may change status to indicate that the boosted acceleration was achieved. In some implementations, a tally or a score may be kept and displayed that keeps track of the number of acceleration events where the driver achieves the boosted acceleration.

The boosting system 100, using one or more sensors 112, may determine whether the brake pedal 130 is depressed (206). The one or more sensors 112, such as a brake sensor, may detect or measure an amount of pressure applied to depress the brake pedal 130. If the measured or detected amount of pressure is greater than a threshold, the boosting system 100 may determine that the brake pedal 130 is depressed. The boosting system 100 may trigger the boosted acceleration based a timing of the transition of when the brake pedal 130 is depressed, then released or when the accelerator pedal 110 is depressed, and/or combinations thereof at the location of the acceleration event.

The boosting system 100 determines that there is an acceleration event where the driver of the vehicle 102 should begin to depress the accelerator pedal 110 to activate the boosted acceleration based on the acceleration information (208). For example, the boosting system 100 may determine that the driver should depress the accelerator pedal 110 within a threshold time limit, such as approximately 2 s, after the acceleration event, such as when a traffic light transitions to a green light. The boosting system 100 may extract the timing of when the traffic light transitions to the green light from the acceleration information and apply a pre-determined or a user-configured threshold time limit to the timing of when the traffic light transitions. The boosting system 100 may require that the driver depress the accelerator pedal 110 within the threshold time limit to activate the boosted acceleration. In another example, the boosting system may apply the threshold time limit to when a ramp meter on an on-ramp turns to a green light. The boosting system 100 may require the brake pedal 130 be depressed and released before the accelerator pedal 110 is depressed within the threshold limit to activate the boosted acceleration.

In some implementations, the boosting system 100 determines the acceleration event that would cause the driver to depress the accelerator pedal 110 to accelerate using navigational map information and/or traffic condition information included in and/or extracted from the acceleration information. For example, the navigation unit 114 may identify the location of acceleration events where the driver should depress the accelerator pedal 110 to accelerate the vehicle 102, such as the entrance of an on-ramp, an entrance of a speed zone of a roadway is increased, or an exit from a construction or accident zone, from the navigational map information and/or traffic condition information. The boosting system 100 may determine that the driver should depress the accelerator pedal 110 within a threshold time limit of or a threshold distance from the location of the acceleration event.

In some implementations, the boosting system 100 determines the acceleration event based on a distance or a relative distance between the vehicle 102 and another vehicle in front of the vehicle 102. The boosting system 100 may calculate the change in distance between the vehicle 102 and the other vehicle, and if the distance is increasing, the boosting system 100 may determine that there is an acceleration event and that the driver should depress the accelerator pedal 110. An increasing relative distance between the two vehicles may indicate that the vehicle in front is accelerating faster than the vehicle in back. The boosting system 100 may further require that the distance between the two vehicles be greater than or equal to a safety margin to ensure that the vehicle in back does not collide with the vehicle in front. The boosting system 100 may detect that the vehicle 102 is drafting behind another vehicle, and when the driver shifts or moves the vehicle 102 to pass the other vehicle, the boosting system 100 may provide the boosted acceleration if the accelerator pedal is depressed at a point in time where the vehicle 102 has room to pass the other vehicle. This may occur along a straightaway or a turn where the vehicle 102 is drafting behind the other vehicle.

In some implementations, the boosting system 100 may use a combination of the distance or relative distance, the navigational map information, the traffic condition information and/or the traffic light transition to determine when the driver should depress the accelerator pedal 110 to activate the boosted acceleration.

If the brake pedal 130 is depressed, the boosting system 100 may require a determination that the brake pedal 130 is released before the accelerator pedal 110 is depressed within the threshold time limit for the boosted acceleration to function. The boosting system 100 may determine that the brake pedal 130 is released before the accelerator pedal 110 is depressed using one or more sensors 112 (210). That is, the ECU 116 may obtain an indication from a braking pedal sensor that the brake pedal 130 is released before the ECU obtains an indication from the accelerator pedal sensor that the accelerator pedal 110 is depressed.

The boosting system 100 determines that the accelerator pedal 110 is depressed, and in some implementations, that the accelerator pedal 110 is depressed and the brake pedal 130 is released (212). The boosting system 100 may use the brake pedal sensor and the accelerator pedal sensor to determine that the brake pedal 130 is released and the accelerator pedal 110 is depressed, respectively. The amount of force applied to depress the accelerator pedal 110 corresponds to an amount of energy, tuning or power output that moves the wheels 140 during a normal acceleration. The amount of force applied to depress the accelerator pedal 110 may correspond to an additional amount of energy or power output or another tuning that moves the wheels 140 during a boosted acceleration.

In response to determining that the accelerator pedal 110 is depressed, the boosting system 100 may determine whether the accelerator pedal 110 is depressed is within a threshold time limit of the acceleration event (214). In some implementations, the boosting system 100 may determine whether the brake pedal 130 is released and the accelerator pedal 110 is depressed within the threshold time limit of the acceleration event. The boosting system 100 compares a time of when the accelerator pedal 110 and/or the transition of the brake pedal 130 to the accelerator pedal 110 with the timing of when the acceleration event occurs and a threshold time limit afterwards.

If the accelerator pedal 110 and/or the transition occurs within the threshold time limit, the boosting system 100 engages the boosted acceleration (216). The boosting system 100 may output or provide an additional amount of energy in addition to the normal amount of energy that is outputted or provided to move or propel the wheels 140. For example, the boosting system 100 may release an electrical energy storage reserve designated for the boosted acceleration and convert the electrical energy storage reserve to additional power to move or propel the vehicle 102. In another example, the boosting system 100 may spool a turbocharger to force additional air or fuel into the engine 126, which further drives a transmission or drivetrain 136 to move the wheels 140.

In some implementations, when the boosting system 100 engages the boosted acceleration, other features, such as lights, audio or a visual display on the user interface 124, may be simultaneously implemented to provide a game-like atmosphere (217). For example, the boosting system 100 may update the user interface 124 with a new score or a new screen or output audio, such as an engine revving noise, which celebrates the achievement of the boosted acceleration.

If the accelerator pedal 110 and/or the transition occurs before the acceleration event occurs, the boosting system 100 may stall the vehicle 102 (218). The amount of energy that is converted or released may be less than the amount of energy that is released during normal acceleration or may delay the release of the amount of energy that is released during normal acceleration. For example, the boosting system 100 may stall the engine 126 or delay the release of electrical energy from the battery 132 to the motor and/or generator 128. In another example, the boosting system 100 may partially delay opening of a valve that allows air or fuel into the engine 126 to reduce power output that drives the transmission or drivetrain 136 to move the wheels 140.

If the accelerator pedal 110 and/or the transition occurs after the threshold time limit, the boosting system 100 may accelerate the vehicle 102 using a normal acceleration (220). That is, the boosting system 100 does not provide any additional energy, air or fuel to increase the power output that moves the wheels 140. The vehicle 102 operates with a normal acceleration that corresponds to the amount of applied force on the accelerator pedal 110.

In some implementations, the amount that the vehicle 102 suddenly accelerates or boosts is based on the amount that the accelerator pedal 110 is depressed and/or a difference in the timing of when the accelerator is depressed within the threshold time limit. For example, if the accelerator pedal 110 is depressed halfway and within the threshold time limit after the acceleration event, the boosting system 100 may provide fifty percent (50%) of the additional energy or power output, whereas, if the accelerator pedal 110 is completely depressed the boosting system 100 may provide all of the additional energy or power output. The boosting system 100 may provide a boosted acceleration that directly correlates or corresponds with the amount that the accelerator is depressed. In another example, the boosting system 100 may provide a boosted acceleration that directly correlates or corresponds with the proportion of time that remains when the accelerator pedal 110 is depressed relative to the threshold time limit. If a portion of the threshold time limit after the acceleration event passes and the accelerator pedal 110 is depressed, the boosting system 100 may provide a portion of the amount of additional energy or power output. The portion may be proportional to the amount of time remaining until the threshold time limit.

FIG. 3 is a sequence diagram of the process 300 for obtaining the acceleration information used by the boosting system 100. One or more computers or one or more data processing apparatuses, for example, the ECU 116 of the boosting system 100 of FIG. 1, appropriately programmed, may implement the process 300.

The boosting system 100 may establish wireless communication with a traffic infrastructure 104 to obtain the acceleration information (302). The ECU 116 may directly connect with the traffic infrastructure through the communication device 122. The communication device 122 may be a vehicle-to-infrastructure (V2I) communication device. In some implementations, the ECU 116 uses the network access device 120 to communicate with the traffic infrastructure 104 through the wireless network 108.

Once communication between the boosting system 100 and the traffic infrastructure has been established, the traffic infrastructure 104 may provide acceleration information to the boosting system 100. The boosting system 100 may obtain the acceleration information using the communication device 122 (304). The acceleration information may include signal transition information. The signal transition information includes a timing of when a traffic light or ramp meter transitions between different states and/or lights, such as when the traffic light or ramp meter transitions from the red light to the green light, e.g., a straight green light or a green turn light, and/or from the green light to the yellow light and then to the red light. The signal transition information may include the timing of when the traffic light transition to other states, such as a red, yellow, and/or green turn signal. For example, the signal transition information may indicate that in 3 s the light will transition from the red light to the green light. The signal transition information may provide a count down from red to 3, 2, 1, green. The communication device 122 may, subsequently, provide the signal transition information to the ECU 116 (320).

In some implementations, the boosting system 100 connects with one or more external databases 106 via the network access device 120. The ECU 116 or navigation unit 114 may establish a connection with the one or more external databases 106 using the network access device 120 (306). The one or more external databases 106 may provide the acceleration information, which may include navigational map information and/or traffic condition information that has locations of one or more acceleration events, to the navigation unit 114 and/or the ECU 116 (308). The navigation unit 114 and/or the ECU 116 may obtain the locations of the acceleration events from the one or more external databases 106. The navigation unit 114 may obtain the current location of the vehicle 102 (310), and subsequently, provide the current location of the vehicle 102 and/or the locations of the acceleration events to the ECU 116 (318).

In some implementations, the boosting system 100 detects and/or measures a distance between the vehicle 102 and a surrounding vehicle. The boosting system 100 may use one or more sensors 112, such as a proximity sensor, to detect another vehicle in front of the vehicle 102 (312). The one or more sensors 112 may measure a distance between the vehicle 102 and the other vehicle (314). The one or more sensors 112 may provide the measured distance to the ECU 116, which may use the measure distance over a period of time to determine whether the distance to the vehicle in front is increasing and/or beyond a threshold distance (316).

Figure 4:
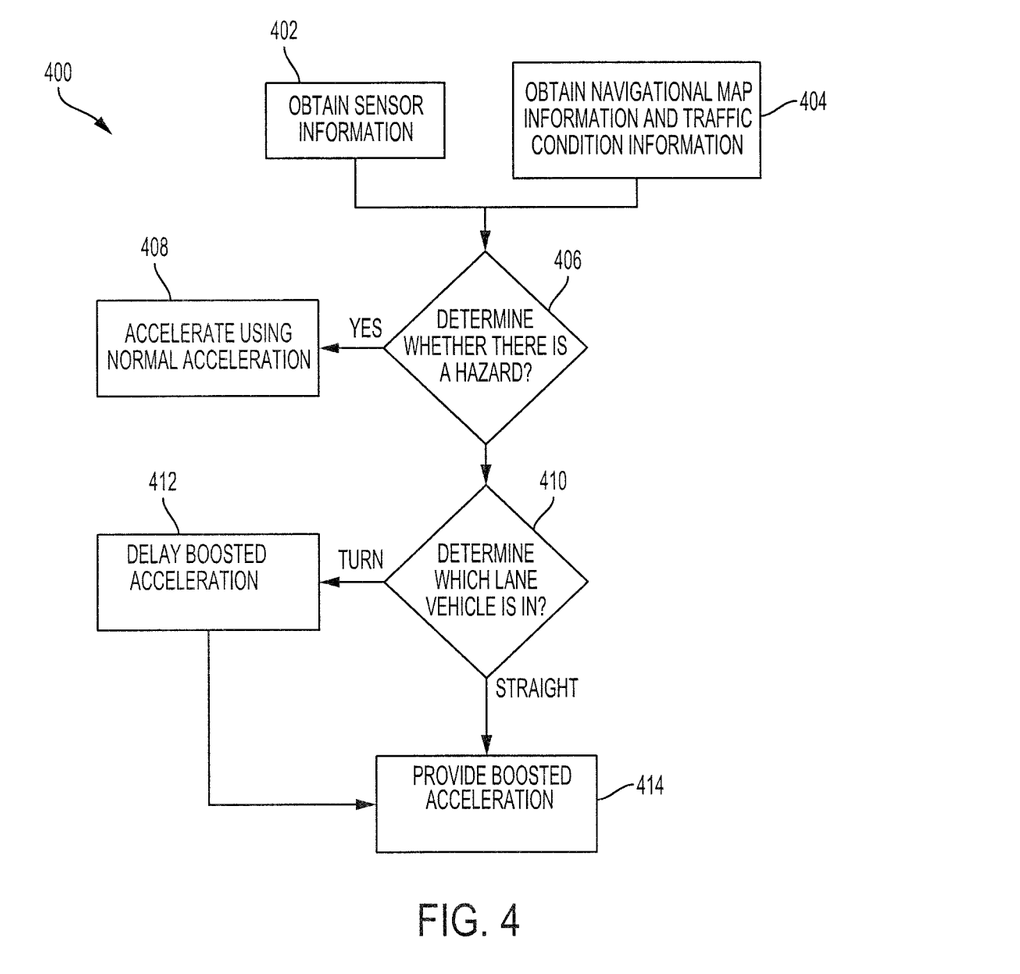
FIG. 4 is a flow diagram of an example process for accelerating the vehicle using the acceleration boosting system of FIG. 1 in different situations according to an aspect of the invention.

FIG. 4 is a flow diagram of a process 400 for accelerating the vehicle 102 of FIG. 1 in different situations. One or more computers or one or more data processing apparatuses, for example, the ECU 116 of the boosting system 100 of FIG. 1, appropriately programmed, may implement the process 400.

The boosting system 100 may obtain sensor information using one or more sensors 112 (402). The sensor information may include an image of an object, a vehicle or other hazard that is in proximity to the vehicle 102. For example, a camera may capture the image of the surroundings of the vehicle 102. The sensor information may include a measurement of a distance between the vehicle 102 and the object, the vehicle or the other hazard. In another example, a proximity sensor may detect a surrounding object, vehicle or other hazard and/or measure a distance between the vehicle 102 and the surrounding object, vehicle or other hazard.

The boosting system 100 obtains traffic condition information and/or navigational map information (404). The boosting system 100 may obtain the traffic condition information using the navigation unit 114. The traffic condition information includes a location or indication of traffic surrounding the vehicle 102. For example, the traffic condition information may include locations of one or more vehicles in proximity of the vehicle 102.

The boosting system 100 determines whether there is a hazard based on the traffic condition information, sensor information or combinations thereof (406). In order to determine whether there is a hazard, the boosting system 100 may perform object recognition on the image included in the sensor information and may identify an object or a vehicle from the image. The boosting system 100 may use the measurement of the distance between the vehicle and the surrounding object, vehicle or other hazard and may determine that there is a hazard if the distance is less than or equal to a threshold distance, such as 1 meter (m). If there is a hazard, the boosting system 100 does not provide or output a boosted acceleration to the vehicle 102 and accelerates the vehicle 102 using a normal acceleration consistent with the normal operation of the vehicle 102 when the driver depresses the accelerator pedal 110 (408).

The measurement of the distance may be extracted from the sensor information or the boosting system 100 may calculate the distance using the location or indication of traffic included in the traffic information. In some implementations, the boosting system 100 identifies a surrounding vehicle and the distance between the vehicle 102 and the surrounding vehicle using the location or indication of traffic extracted from the traffic information.

If the boosting system 100 does not identify an object or vehicle in the image or if the distance to the object or the vehicle is not less than or equal to the threshold distance, the boosting system 100 may determine that there is no hazard. If the boosting system 100 determines that there is no hazard, the boosting system 100 determines which lane the vehicle 102 is in. The boosting system 100 may determine which lane the vehicle 102 is in based on the current location of the vehicle 102 and map information outlining the roadway the vehicle 102 is travelling (410). The boosting system 100 may extract the current location from the navigational map information. In some implementations, the boosting system 100 may use a camera or other sensor to identify the lane in which the vehicle 102 is in. For example, the camera may capture an image of a traffic sign that marks which lanes are straightaways and/or turns. The boosting system 100 may identify the location of the vehicle 102 relative to the lane markers and use the image of the traffic sign to determine the lane in which the vehicle 102 is in. In some implementations, the boosting system 100 may determine that the vehicle 102 is in the turn lane if the turn signal is on.

If the boosting system 100 determines that the vehicle 102 is in the turn lane, the boosting system 100 may delay the boosted acceleration until after the vehicle 102 exits the turn (412). The boosting system 100 may use a steering wheel sensor and measure the angle of the steering wheel. When the steering wheel is angled, which indicates that the vehicle 102 is turning, the boosting system 100 delays the boosted acceleration until after the vehicle 102 exits the turn. When the angle indicates that the steering wheel has returned to a straight position from an angled position, the boosting system 100 may determine that the vehicle 102 has exited the turn and may provide or output the boosted acceleration. For example, a driver of the vehicle 102 may turn the vehicle 102 to make a left turn, and when the steering wheel returns to the straightaway position, which indicates that the vehicle 102 is traveling in a straight direction, the boosting system 100 may provide or output the boosted acceleration. In some implementations, the boosting system 100 may determine that the vehicle 102 has entered a turn when the turn signal is on and has exited the turn when the turn signal resets and turns off.

Figure 5:
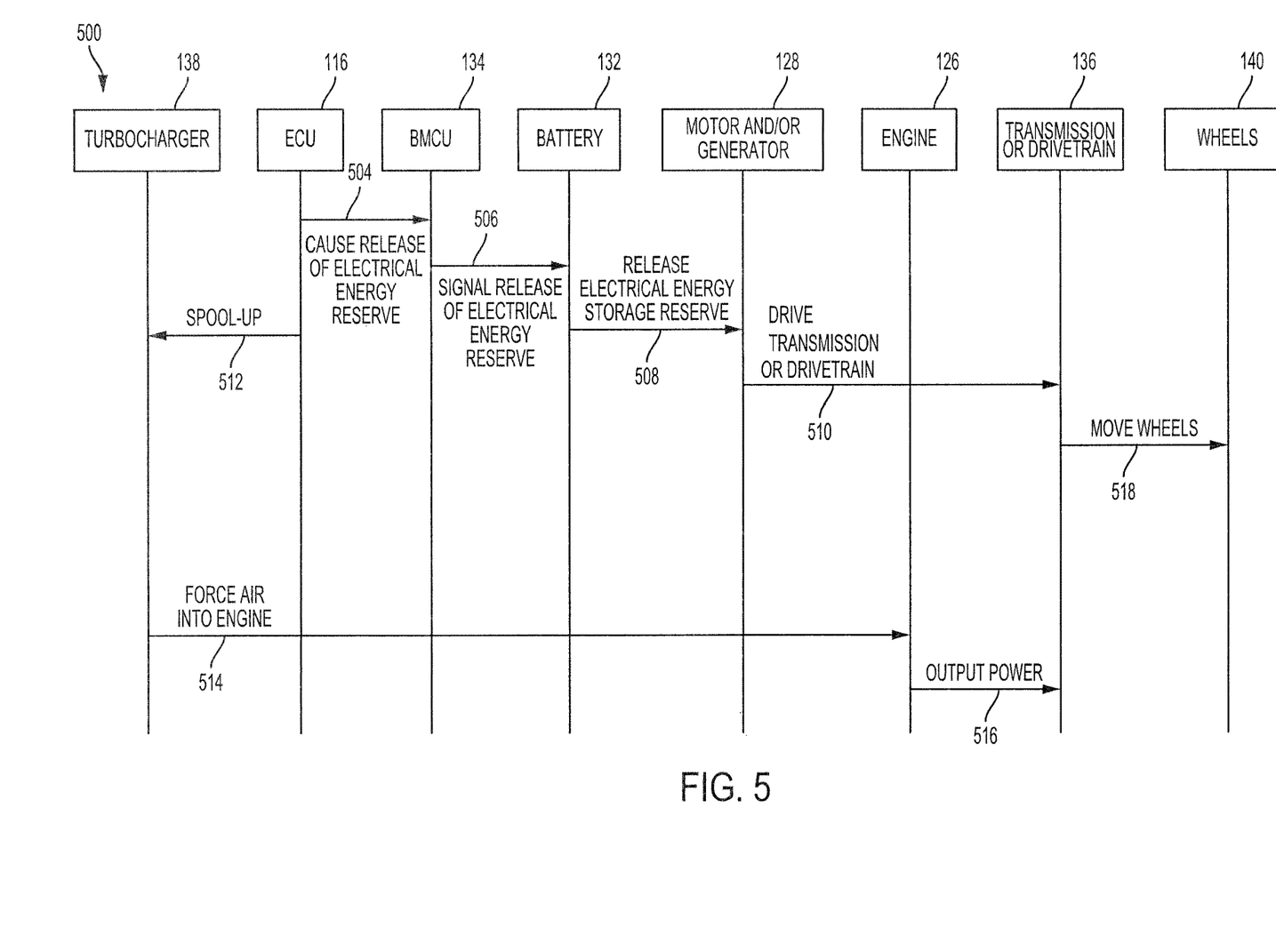
FIG. 5 is a sequence diagram of an example process for implementing the boosted acceleration provided by the acceleration boosting system of FIG. 1 according to an aspect of the invention.

If the vehicle 102 has exited a turn after being in the turn lane or the vehicle 102 is in the straight lane, the boosting system 100 provides or outputs the boosted acceleration (414). FIG. 5 further describes the process 500 that the boosting system 100 performs to execute the boosted acceleration.

FIG. 5 is a sequence diagram of the process 500 for implementing the boosted acceleration. One or more computers or one or more data processing apparatuses, for example, the ECU 116 of the boosting system 100 of FIG. 1, appropriately programmed, may implement the process 500.

When the conditions for the boosted acceleration are met, such as in an electric vehicle (EV), plug-in hybrid electric vehicle (PHEV) or hybrid vehicle, the ECU 116 sends a signal to the BMCU 134 to cause the release of an electrical energy storage reserve (504). The battery 132 may maintain an electrical energy storage reserve that is released when the ECU 116 signals for the boosted acceleration. The battery 132 may accumulate the state of charge to maintain the electrical energy storage reserve while driving. The BMCU 134 may signal to the battery 132 to release of the electrical energy storage reserve (506). The battery 132 release the electrical energy storage reserve to the motor and/or generator 128 (508). The motor and/or generator 128 converts the electrical energy into mechanical energy and may drive the transmission or drivetrain 136 (510) and/or power the wheels 140 (518).

In some implementations, when the conditions for the boosted acceleration are met, such as in a vehicle driven by an internal combustion engine, the ECU 116 sends a signal to the turbocharger 138 that causes the turbocharger 138 to spool-up (512). The turbocharger 138 may spool-up and release or force air into the engine 126 (514). The engine 126 provides power to the transmission or drivetrain 136 (516). The transmission or drivetrain 136 uses the power or the electrical energy and moves the multiple wheels 140 (518).

By releasing the electrical energy storage reserve and/or spooling the turbocharger to release or force air into the engine 126, the boosting system 100, and in particular the ECU 116, causes the vehicle 102 to accelerate at a faster pace than when the vehicle 102 is operating normally, which results in the boosted acceleration. The boosting system 100 releases an additional amount of energy that is greater than the amount of energy to be converted to move the wheels 140 when the vehicle 102 is performing a normal acceleration.

Figure 6:
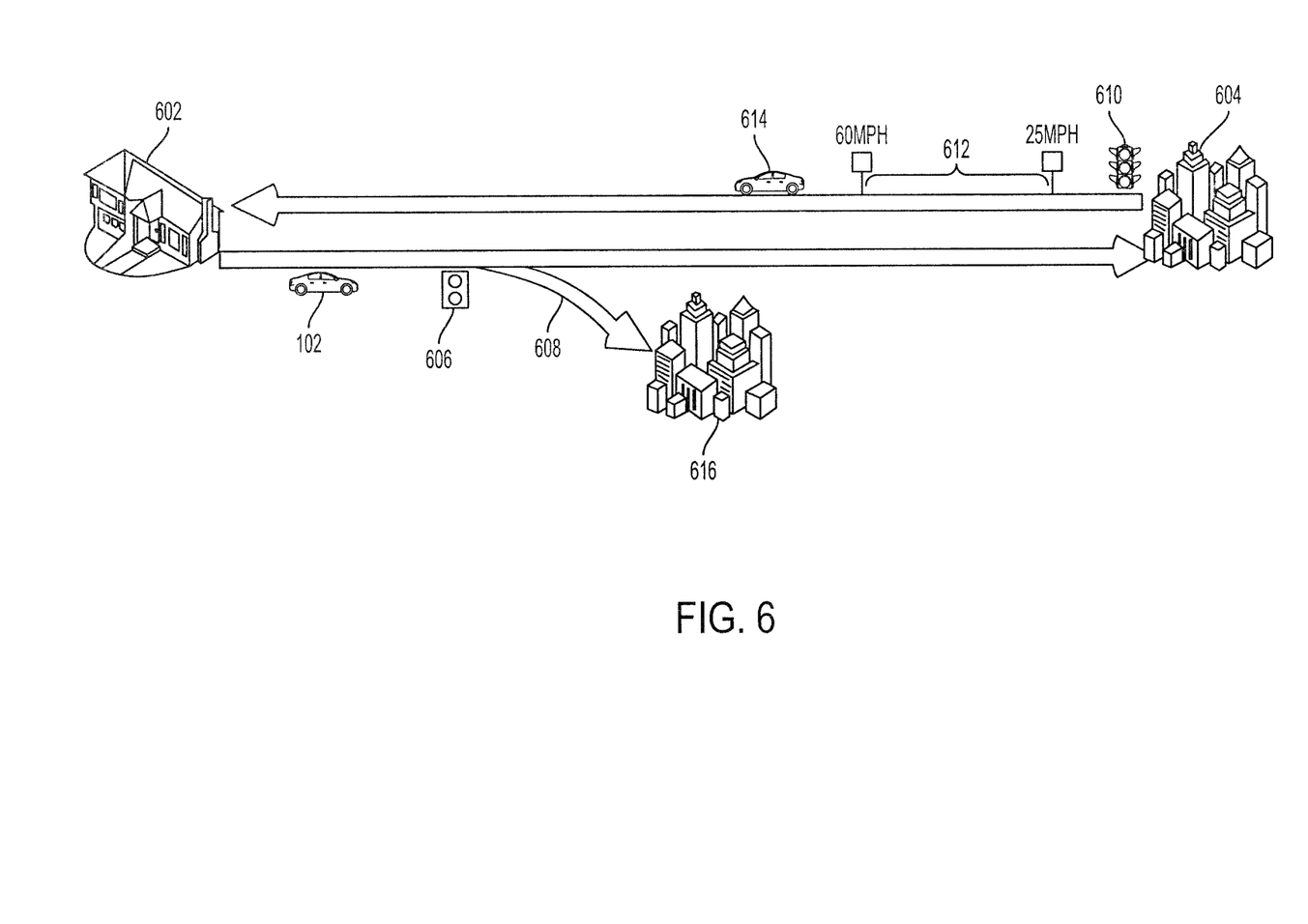
FIG. 6 is an example illustration showing different acceleration events that cause a boosted acceleration for the vehicle when the accelerator pedal is depressed within a threshold limit according to an aspect of the invention.

FIG. 6 shows different acceleration events that cause a boosted acceleration when the accelerator pedal is depressed within a threshold time limit. As a driver drives the vehicle 102 from a start location, such as his or her home 602, to a destination location, such as his or her office 604, the driver may encounter various acceleration events. The various acceleration events may include road features and/or traffic features, such as a ramp meter 606, a construction or speed zone 612, a traffic signal 610, another vehicle 614, or an on-ramp 608.

As the driver drives the vehicle 102 from the home 602 to the office 604, the driver may decide to take a detour to the city 616. The driver may have to stop at a ramp meter 606 to enter the on-ramp 608. If the driver depresses the accelerator pedal 110 within a threshold time limit after the ramp meter 606 transitions from red to green, the boosting system 100 may provide a boosted acceleration. In some implementations, the boosting system 100 may detect that the vehicle 102 is entering an on-ramp 608 and provide a boosted acceleration if the driver depresses the accelerator pedal 110 within a threshold distance of entering and/or exiting the on-ramp 608 to merge into traffic on a highway.

As the driver drives the vehicle 102 from the office 604 to the home 602, the driver may encounter a traffic signal 610. If the driver depresses the accelerator pedal 110 within a threshold time limit after the traffic signal 610 turns green, the boosting system 100 may provide a boosted acceleration. In some implementations, the boosting system 100 may detect that the vehicle 102 is exiting a construction zone or speed zone 612 where the speed limit increases and/or the distance between a vehicle 614 that may be in front of the vehicle 102 is increasing. If the vehicle 102 is exiting the constructions zone or speed zone 612 where the speed limit increases and/or the distance between the vehicle 614 and the vehicle 102 is increasing beyond a threshold distance, the boosting system 100 may provide the boosted acceleration when the driver depresses the accelerator pedal within a threshold time limit after exiting the construction zone or speed zone and/or after the distance increases beyond the threshold distance.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An acceleration boosting system for a vehicle, comprising:
    at least one of a communication device, a navigation unit or a first sensor configured to obtain acceleration information related to a timing of an acceleration of the vehicle;
    a second sensor configured to detect or measure an applied force on an accelerator pedal of the vehicle, the applied force corresponding to a first amount of energy or a first tuning that is used to power or propel the vehicle during a normal acceleration; and
    an electronic control unit connected to the first sensor or the second sensor and configured to:
        determine that the acceleration information indicates that a driver should begin to accelerate,
        determine that the accelerator pedal is depressed within a threshold time limit of the indication that the driver should begin to accelerate, and
        cause a second amount of energy to be converted that is different than the first amount of energy to be converted or use a second tuning that is different than the first tuning to move or propel a plurality of wheels of the vehicle for a boosted acceleration.

2. The acceleration boosting system of claim 1, wherein the second amount of energy is greater than the first amount of energy to be converted to move or propel the plurality of wheels.

3. The acceleration boosting system of claim 2, further comprising:
    a turbocharger that is configured to boost a power output of an engine of the vehicle;
    wherein to cause the second, amount of energy to be greater than the first amount of energy the electronic control unit is configured to spool the turbocharger to boost the power output of the engine.

4. The acceleration boosting system of claim 2, further comprising:
    a battery for storing electrical energy including a reserve of the electrical energy for boosting;
    a battery management control unit configured to manage the electrical energy in the battery;
    a drivetrain that adapts the electrical energy to move or propel the plurality of wheels;
    wherein to cause the second amount of energy to be greater than the first amount of energy the electronic control unit is configured to:
        release the reserve of the electrical energy stored in the battery to the drivetrain, and
        cause the drivetrain to move the plurality of wheels.

5. The acceleration boosting system of claim 1, wherein the accelerator pedal is depressed before the acceleration information indicates that the driver should begin to accelerate, wherein the second amount of energy is less than the first amount of energy to be converted to move or propel the plurality of wheels.

6. The acceleration boosting system of claim 1, wherein the communication device is a vehicle-to-infrastructure (V2I) communication device, wherein to obtain the acceleration information the V2I communication device is configured to:
    establish a connection with a traffic light; and
    receive, from the traffic light, the acceleration information, wherein the acceleration information includes an indication of when the traffic light is turning green.

7. The acceleration boosting system of claim 1, wherein to obtain the acceleration information the first sensor is configured to detect or measure a distance between the vehicle and another vehicle that is in front of the vehicle, wherein to determine that the acceleration information indicates that the driver should begin to accelerate, the electronic control unit is configured to determine that the measured distance between the vehicle and the other vehicle is increasing and that measured distance between the vehicle and the other vehicle is greater than a threshold distance.

8. The acceleration boosting system of claim 1, wherein to obtain the acceleration information the navigation unit is configured to:
    determine a current location of the vehicle; and
    identify an acceleration event within a threshold distance of the current location of the vehicle.

9. An acceleration boosting system for a vehicle, comprising:
    a navigation unit configured to obtain an acceleration event that indicates a timing of when the vehicle should accelerate;
    a sensor configured to detect or measure an applied force on an accelerator pedal of the vehicle that corresponds to a first amount of energy that is used to power or propel the vehicle during a normal acceleration; and
    an electronic control unit connected to the navigation unit and configured to:
        determine that a driver should begin to accelerate based on the acceleration event,
        determine that the accelerator pedal is depressed within a threshold time limit of the acceleration event, and
        cause a second amount of energy to be converted that is greater than the first amount of energy to be converted to move or propel a plurality of wheels of the vehicle for a boosted acceleration.

10. The acceleration boosting system of claim 9, further comprising:
    a turbocharger that is configured to boost a power output of an engine of the vehicle;
    wherein to cause the second amount of energy to be greater than the first amount of energy the electronic control unit is configured to spool the turbocharger to boost the power output of the engine.

11. The acceleration boosting system of claim 9, further comprising:

a battery for storing electrical energy including a reserve of the electrical energy for boosting;

a battery management control unit configured to manage the electrical energy in the battery;

a drivetrain that adapts the electrical energy to move or propel the plurality of wheels;

wherein to cause the second amount of energy to be greater than the first amount of energy the electronic control unit is configured to:

release the reserve of the electrical energy stored in the battery to the drivetrain, and     cause the drivetrain to move the plurality of wheels.

12. The acceleration boosting system of claim 9, wherein the acceleration event is an on-ramp of a highway.

13. The acceleration boosting system of claim 9, wherein to obtain the acceleration event the navigation unit is configured to:

determine a current location of the vehicle; and identify an acceleration event within a threshold distance of the current location of the vehicle.

14. The acceleration boosting system of claim 9, wherein the electronic control unit is configured to:

determine that a brake pedal of the vehicle has been released before the accelerator pedal is depressed within the threshold time limit of the acceleration event.

15. The acceleration boosting system of claim 9, wherein to determine that the accelerator pedal is depressed within the threshold time limit of the acceleration event the electronic control unit is configured to:

compare a timing of when the accelerator pedal is depressed to a timing of when the vehicle should accelerate.

16. An acceleration boosting system for a vehicle, comprising:

a sensor configured to detect or measure an applied force on an accelerator pedal of the vehicle that corresponds to a first amount of energy that is used to power or propel the vehicle during a normal acceleration; and an electronic control unit connected to the sensor and configured to:

obtain acceleration information that indicates when a driver of the vehicle should accelerate,     determine that there is an acceleration event based on the acceleration information,     determine that the accelerator pedal is depressed within a threshold time limit of the acceleration event, and     cause a second amount of energy to be converted that is different than the first amount of energy to be converted to move or propel a plurality of wheels of the vehicle.

17. The acceleration boosting system of claim 16, wherein the second amount of energy is less than the first amount of energy.

18. The acceleration boosting system of claim 16, wherein the second amount of energy is greater than the first amount of energy.

19. The acceleration boosting system of claim 18, further comprising:

a turbocharger that is configured to boost a power output of an engine of the vehicle;

wherein to cause the second amount of energy to be greater than the first amount of energy the electronic control unit is configured to spool the turbocharger to boost the power output of the engine.

20. The acceleration boosting system of claim 16, wherein to determine that the accelerator pedal is depressed within the threshold time limit of the acceleration event the electronic control unit is configured to:

compare a timing of when the accelerator pedal is depressed to the timing of when the vehicle should accelerate.

\* \* \* \* \*